United States Patent [19]
Ezra et al.

[11] Patent Number: 5,392,140
[45] Date of Patent: Feb. 21, 1995

[54] OPTICAL DEVICE WITH TWO LENS ARRAYS WITH THE SECOND ARRAY PITCH AN INTEGRAL MULTIPLE OF THE FIRST ARRAY PITCH

[75] Inventors: David Ezra; Graham J. Woodgate, both of Oxfordshire, United Kingdom

[73] Assignee: Sharp Kabushiki Kaisha, Osaka, Japan

[21] Appl. No.: 61,441

[22] Filed: May 14, 1993

[30] Foreign Application Priority Data

May 15, 1992 [GB] United Kingdom ............... 9210399

[51] Int. Cl.⁶ .................... G02F 1/1335; G02B 27/10
[52] U.S. Cl. ..................................... 359/41; 359/40; 359/619
[58] Field of Search .............. 359/40, 41, 49, 48, 359/619, 641, 642

[56] References Cited

U.S. PATENT DOCUMENTS

| | | | |
|---|---|---|---|
| 3,701,521 | 10/1972 | Le Vantine | 269/48 |
| 4,686,519 | 8/1987 | Yoshida et al. | 359/40 |
| 4,707,077 | 11/1987 | Marom | 359/41 |
| 4,732,456 | 3/1988 | Fergason et al. | 350/334 |
| 4,867,514 | 9/1989 | Waldron | 350/1.1 |
| 4,915,479 | 4/1990 | Clarke | 359/49 |
| 5,052,783 | 10/1991 | Hamada | 359/40 |
| 5,083,854 | 1/1992 | Zampolin et al. | 359/40 |
| 5,161,042 | 11/1992 | Hamada | 359/49 |
| 5,175,637 | 12/1992 | Jones et al. | 359/48 |
| 5,239,412 | 8/1993 | Naka et al. | 359/619 |

FOREIGN PATENT DOCUMENTS

| | | |
|---|---|---|
| 0425266 | 5/1991 | European Pat. Off. . |
| 0431886 | 6/1991 | European Pat. Off. . |
| 0440495 | 8/1991 | European Pat. Off. . |
| 0444872 | 9/1991 | European Pat. Off. . |
| 60-114832 | 6/1985 | Japan ............ 359/40 |
| 62-075513 | 4/1987 | Japan ............ 359/40 |
| 62-267723 | 11/1987 | Japan ............ 359/40 |
| 5-83746 | 4/1993 | Japan . |
| 184919 | 2/1937 | Switzerland . |
| 1222008 | 2/1971 | United Kingdom . |
| 1273062 | 5/1972 | United Kingdom . |
| 2206763 | 1/1989 | United Kingdom . |
| 2252175 | 7/1992 | United Kingdom . |

OTHER PUBLICATIONS

Collender, *Information Display*, Nov./Dec. 1967, pp. 27-31, "The Stereoptiplexer".
Collender, *SPIE,* vol. 761, "True 3D Imaging Techniques & Display Technologies", (1987), Method for Electronics 3-D Moving Pictures Without Glasses, pp. 2-22.

*Primary Examiner*—Anita Pellman Gross
*Attorney, Agent, or Firm*—Renner, Otto, Boisselle & Sklar

[57] ABSTRACT

A three-dimensional display comprises a spatial light modulator (13), such as a liquid crystal display, sandwiched between first and second lenticular screens (12, 16). The pitch of the lenticules of the second screen (16) is an integral multiple of that of the first screen (12). The spatial light modulator (13) comprises a plurality of cells aligned with the lenticules of the first screen (12). A linear array of sequentially illuminated light sources (1-8) is focused by an optical system (10) into a plurality of collimated light beams with different angles of incidence on the first screen (12). For each illumination of the light sources, the spatial light modulator carries a plurality of 2D interlaced views.

20 Claims, 5 Drawing Sheets

OPTICAL DEVICE WITH TWO LENS ARRAYS WITH THE SECOND ARRAY PITCH AN INTEGRAL MULTIPLE OF THE FIRST ARRAY PITCH

The present invention relates to an optical device. Such a device may be used to convert spatial and temporal information into directional information, for instance so as to provide an autostereoscopic (no viewing aids) three-dimensional display. Another possible application of such a device is in the field of optical information processing.

Known three-dimensional (3D) display devices which can create images of opaque moving objects rely on creating the perception of a 3D image to a human observer by displaying a number of 2-dimensional (2D) images. Each of the 2D images is a view of the object from a particular direction and is "replayed" in that direction. The accuracy and effectiveness of these 3D images and the maximum display size and freedom of viewer location increase as the number of 2D views displayed increases.

Two known techniques for providing 3D displays are lenticular methods and time multiplexed methods. For effective operation, such systems must display a large number of 2D views of an object. In direct view lenticular systems, the number of views is determined by the resolution of a spatial light modulator (SLM) used in the system whereas, in multiple projector lenticular systems, the number of views is determined by the number of separate SLMs used. In time multiplexed systems, the frame rate of the SLM determines the number of views.

With known arrangements, to display a large number of views, the maximum frame rates of available SLMs are insufficient for time multiplexed displays and the maximum resolution of presently available SLMs is insufficient for direct view lenticular methods. Multiple projector lenticular methods with a large number of SLMs are expensive and bulky. Thus, known 3D display systems are incapable of or inconvenient for accurately producing a moving opaque colour autostereoscopic 3D image from a range of perspectives.

GB-A-2206763 discloses a 3D display apparatus comprising a 2D display device, such as a cathode ray tube, disposed in the focal plane of a lens arranged behind a SLM, such as a LCD. Different views are provided in a time-multiplexed manner on the SLM but each view is visible only from a direction dependent on the position of a spot of light emitted from the 2D display device. Thus, the apparatus disclosed in this patent specification provides a rate of 2D views which is limited by the frame rate of the SLM.

An early example of a time multiplexed system is disclosed in an article entitled "The Stereoptiplexer; Competition for the Hologram" by R. B. Collender in Information Display, November/December 1967.

SLMs for use in 3D displays are generally provided by liquid crystal displays (LCD). For certain applications, a large screen size, perhaps of the order of one meter, is desirable in order to provide an effective impression of a 3D image. However, manufacturing difficulties presently limit the size of LCDs to around 400 mm.

Known projection displays produce large images optically from relatively small SLMs. Such known arrangements use lenticular screen techniques which require a respective projector for each 2D view. Thus, an accurate 3D image would require a large number of projectors, which would be expensive and bulky.

Another known 3D technique is disclosed by J. Hamasaki in a paper entitled "Electronic Registration for Autosterioscopic Lenticular 3D TV on a CRT: An Equivalent of a Verifocal Lens for an Electronic 3D Display" at the First International Symposium on 3D images, in 1991.

Known 2D displays using lens arrays and SLMs are disclosed in EP-A-0366462, EP-A-0425266, EP-A-0431886, EP-A-0440495, and EP-A-0444872.

According to first to fourth aspects of the invention, there are provided optical devices as defined in the appended Claims 1, 18, 19, and 20.

Preferred embodiments of the invention are defined in the other appended claims.

It is thus possible to provide optical devices which may be used in direct view and projection display systems and which combine spatial and temporal multiplexing to increase the rate of display of 2D images or views. By increasing the number of views, it is possible to improve the accuracy and appearance of a 3D image. It is also possible to produce a larger 3D display with a larger range of observer positions. No viewing aids are necessary in order to see the 3D effect i.e. the display is autostereoscopic. Furthermore, known image capture techniques may be used so that colour, movement, and opaque images may all be displayed.

The invention will be further described, by way of example, with reference to the accompanying drawings, in which.

Figure 1:
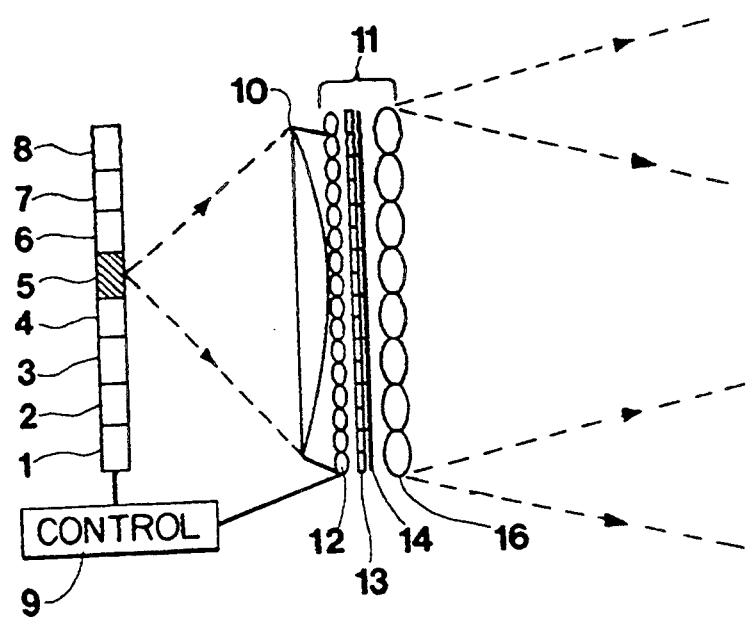
FIG. 1 is a plan view of a direct view display constituting a first embodiment of the invention.

The direct view display shown in FIG. 1 comprises a linear array of N light sources 1 to 8, where N=8 in this embodiment. The light sources 1 to 8 are contiguous so as to form a continuous strip. The light sources are connected to a control circuit 9, which causes the light sources to be illuminated one at a time repetitively in order, FIG. 1 indicating that the light source 5 is illuminated. The linear array of light sources 1 to 8 is disposed in the focal plane of an illumination or collimating system 10, which may comprise a plano-convex lens having a cylindrical convex surface as shown in FIG. 1. The collimating system 10 produces collimated light from each point of each of the light sources 1 to 8. Because the light sources have finite dimensions, the light output of the collimating system has a spread of angles.

Collimated light from the lens of the collimating system 10 is directed towards a hybrid sandwich 11 at an angle which is determined by which of the light sources 1 to 8 is presently illuminated. The hybrid sandwich comprises a lenticular screen (LS1) 12 formed by a plurality of contiguous cylindrical converging lens elements or lenticules having a horizontal pitch p. Alternatively or additionally, the lenticular may have a graded refractive index profile. The lenticular screen 12 is followed by SLM 13 in the form of a 2D LCD, for instance of the ferroelectric or TFT twisted nematic liquid crystal type, which is connected to the control circuit 9. The screen 12 may be mounted directly onto the surface of the LCD of the SLM 13. The SLM 13 comprises a 2D array of picture elements whose light transmission properties (and colour transmission properties for colour display) are controlled by the control circuit 9. For a colour display, red, green, and blue elements for each spot are arranged vertically above each other.

The SLM is followed by a diffuser 14, for instance of the Lambertian type or of the high gain type, and a further lenticular screen 16. The screen 16 is similar to the screen 12 but has a horizontal pitch equal to Mp, where M is greater than 1 and, for most applications, is an integer.

In alternative embodiments, the diffuser 14 may be omitted or replaced by an array of field lenses disposed in the focal planes of the lenticules of the screens 12 and 16.

Figure 2:
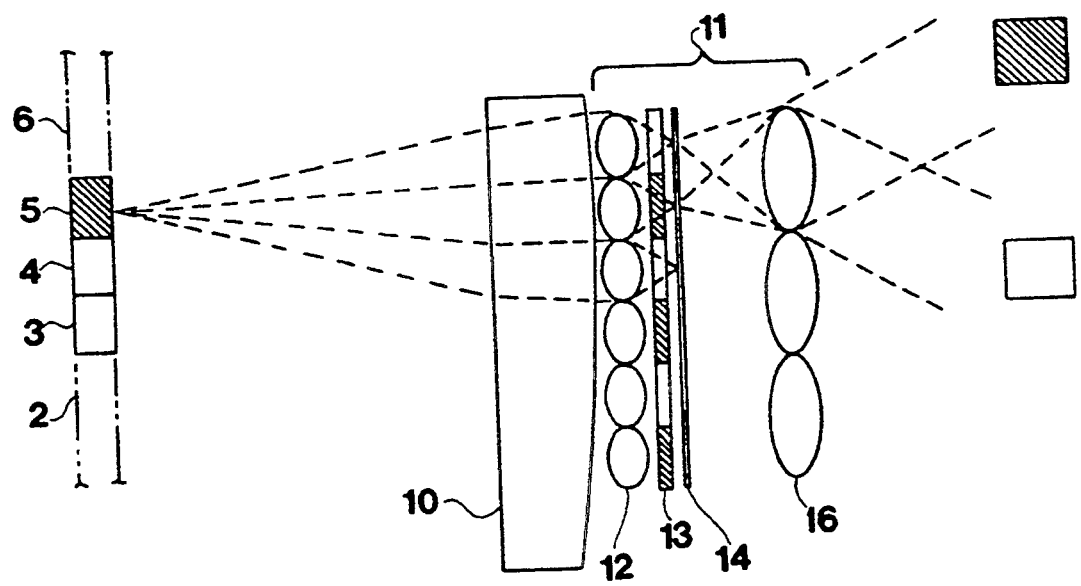
FIGS. 2 and 3 are enlarged plan views of part of the display of FIG. 1 illustrating the operation thereof.

FIG. 2 is an enlarged view of part of the display illustrated schematically in FIG. 1. As shown more clearly in FIG. 2, the SLM comprises a plurality of vertical strip portions disposed substantially in alignment with the lenticules of the screen 12. Each strip portion comprises a linear array of picture elements which are individually controllable by the control circuit 9 in respect of their light attenuations and, for colour displays, their colour transmission properties. The diffuser 14 is located at or near the focal plane of the lenticules of the screen 12 and at or near the focal plane of the lenticules of the screen 16. Each of the lenticules of the screen 16 corresponds to M strip portions of the SLM 13, where M=2 in the embodiment shown.

FIG. 2 illustrates light ray paths which are produced by the display when the light source 5 is illuminated. For purposes of illustration, the light source is shown as an ideal point source. The light rays from the source 5 are collimated into parallel light rays by the illumination lens 10 and are focused by the screen 12 through the SLM 13 onto the diffuser 14. The picture elements of the SLM 13 are controlled by the control circuit 9 so as to provide two views of the image taken from different directions during image capture. The two views are interlaced such that alternate strip portions correspond to a respective one of the views.

The picture elements of the SLM control the amount (and colour for a colour display) of light passing through the SLM so that a 2D array of images of the light source 5 is formed on the diffuser 14 corresponding to the two interlaced views. Each of the lenticules of the screen 16 converts the images on the diffuser 14 into output ray bundles whose angles of emission from the hybrid sandwich 11 depend on the lateral locations of the images on the diffuser 14 with respect to the optical axes of the lenticules. For purpose of illustration, the light sources 1 to 8 are shown as point light sources in FIG. 2 and the two interlaced images represented on the SLM are illustrated by different densities of shading. Thus, for point light sources, the screen 12 forms point light images on the diffuser 14 which are imaged by the screen 16 into monodirectional output ray bundles as shown by the broken lines in FIG. 2. The two views represented on the SLM 13 are therefore visible from different angles corresponding to the angles of the object from which the views were taken during image capture. The grid or barrier 15 prevents each lenticule of the screen 16 from imaging the point light images formed on the diffuser 14 and associated with adjacent lenticules of the screen 16.

Figure 3:
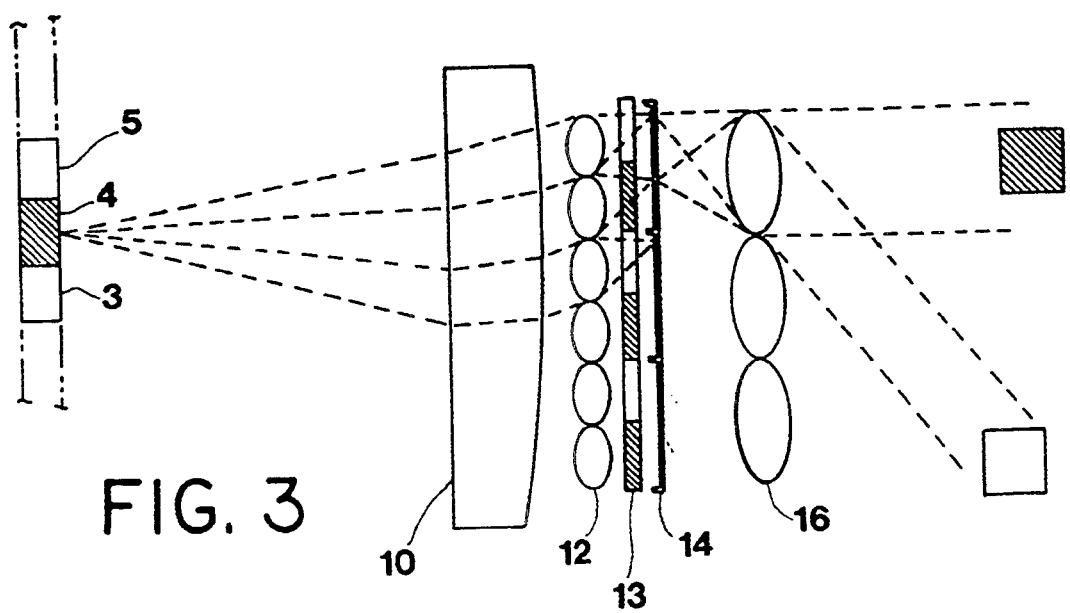

After the light source 5 has been actuated for a predetermined time, the control circuit 9 deactivates the light source 5 and causes the SLM 13 to display the next pair of interlaced views, illustrated in FIG. 3 by light and dark regions. The next light source 4 is then activated as shown in FIG. 3. The illumination lens 10 directs collimated light at a different predetermined angle from that shown in FIG. 2 on to the lenticular screen 12. The lenticular screen 12 images the light through the SLM 13 on to reginos of the diffuser 14 which are laterally displaced with respect to the images formed when the light source 5 is illuminated as shown in FIG. 2. Thus, the lenticular screen 16 provides output ray bundles directed at different angles from those shown in FIG. 2, these different angles corresponding to the directions of the views of the object during image capture.

This sequence of operation continues until each of the light sources of the linear array has been illuminated in turn, with the views represented on the SLM corresponding to a single "frame" of the 3D image. The whole sequence is then repeated for new sets of views representing consecutive frames constituting consecutive 3D images, the rate of repetition or "refresh" being sufficiently large to provide a substantially flicker-free image. For the embodiment shown in FIGS. 1 to 3, the number of views making up each 3D image is equal to M×N, i.e. 2×8=16 views per image. Thus, by combining spatial and temporal multiplexing, a relatively large number of views per 3D image is displayed so as to improve the accuracy and appearance of the 3D image presented to an observer.

Figure 4:
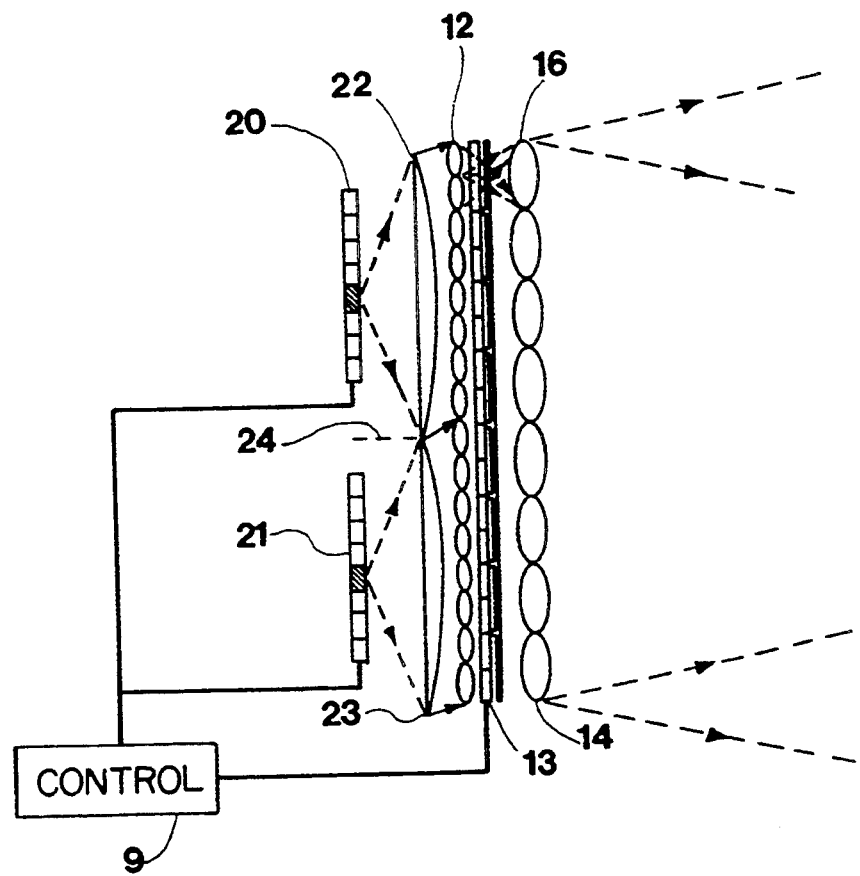
FIG. 4 is a plan view of a direct view display constituting a second embodiment of the invention.

The embodiment shown in FIG. 4 differs from that shown in FIGS. 1 to 3 in that the illumination arrangement comprises a plurality of linear arrays of light sources 20, 21, each having a corresponding illumination lens 22, 23, for instance in the form of a lenticular arrangement. The light sources of the arrays 20, 21 are controlled in synchronism by the control circuit 9. Such an arrangement may, for instance, be desirable in order to reduce the thickness of the device, since the lenses 22, 23 can have a shorter focal length than the lens 10, or in order to provide greater illumination by increasing the number of individual light sources simultaneously illuminated. A single grid or barrier 24 is provided so as to prevent light from one of the arrays being received by the lens or lenticule corresponding to the other array.

Figure 5:
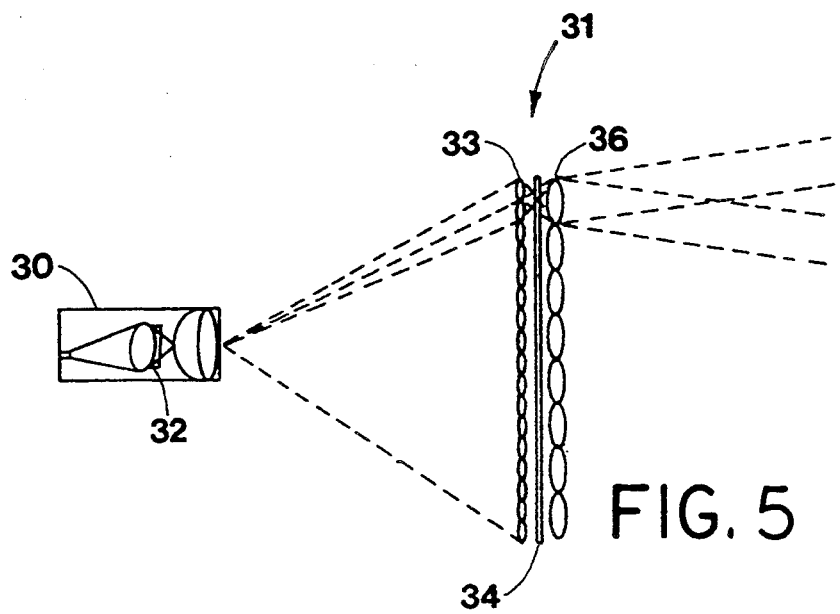
FIG. 5 is a plan view of a projection display constituting a third embodiment of the invention.

FIG. 5 shows a projection display comprising a single projector 30 and a lenticular screen arrangement 31. The projector 30 comprises a powerful source of light, such as a tungsten halogen bulb, and an optical system containing a SLM 32 of the type shown in FIGS. 1 to 4 of the drawings for simultaneously encoding two interlaced views of a 3D image. The lenticular screen arrangement 31 comprises a lenticular screen 33, a diffuser 34, and a lenticular screen 36 substantially identical to the screen 12, the diffuser 14, the grid or barrier 15, and the screen 16, respectively, of FIGS. 1 to 4. However, the lenticular screen arrangement 31 may be substantially bigger than the hybrid sandwich 11. Also, the diffuser 34 may be omitted or replaced by a field lens array.

The SLM 32 controls the intensity (and colour for a colour display) of light through the optical system of the projector 30 so as to project the interlaced views on to the lenticular screen 33. Alternate lenticules of the screen 33 receive alternate vertical strip portions of a respective one of the two views encoded by the SLM 32. The lenticules of the screen 33 image the picture elements on to the diffuser 34, which is located in or near the focal plane of the lenticules of the screen 36. The screen 36 produces output ray bundles which are emitted with different directions corresponding to the two views encoded by the SLM so as to provide a 3D image. The views encoded by the SLM 32 are repeatedly refreshed so as to display a sequence of 3D images.

Figure 6:
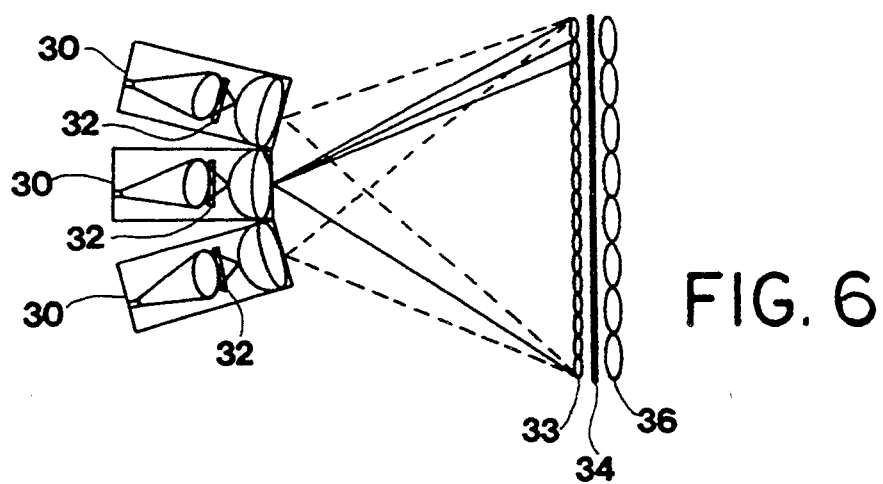
FIG. 6 is a plan view of a projection display constituting a fourth embodiment of the invention.
Figure 7:
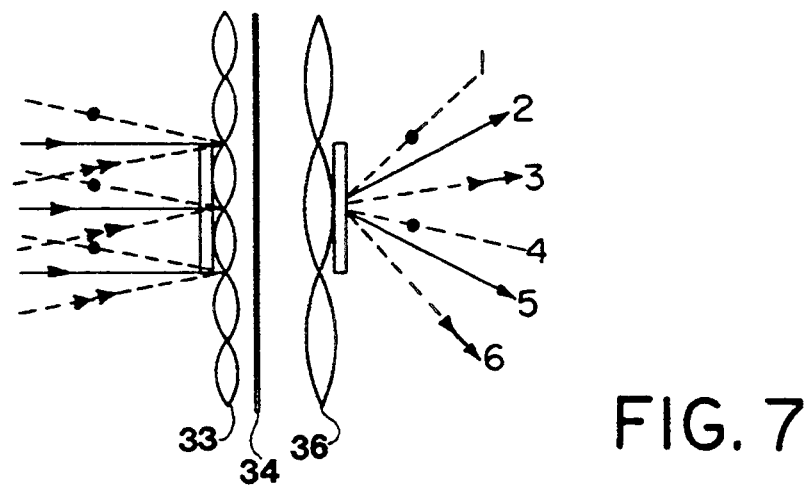
FIG. 7 is an enlarged plan view of part of the projection display of FIG. 6 illustrating the operation thereof.

The embodiment of FIG. 6 differs from that of FIG. 5 in that a plurality of projectors 30, each having a respective SLM 32, is provided. The projectors 30 project pairs of views on to the lenticular screen 33 from different angles so as to increase the number of views for each 3D image. FIG. 7 shows in more detail the angular directions of the output ray bundles of the display corresponding to the M×N views making up the 3D image, where M is the ratio between the pitch of the screen 36 and the pitch of the screen 33 and N is the number of projectors.

In order to ensure that the two views encoded by each SLM are correctly registered on to the screen 33 for each of the projectors, high quality projection lenses may be used. Alternatively, optical errors may be compensated during the manufacture of the lenticular screen 33. In the case of mask manufacturing schemes for lenticular arrays, this may be achieved by imaging the mask through the projection lens during the writing stage.

It is thus possible to provide direct view and projection displays for 3D images which are capable of displaying images of moving, coloured, and opaque objects to provide a convincing 3D effect to an observer, who does not need to wear any viewing aids in order to see the 3D effect. Such displays have a large number of possible applications, for instance as large screen 3D displays which may be used in television, computer aided design, medical imaging, video games, and virtual reality displays. In addition, the hybrid sandwich 11 may be used in optical information processing.

The embodiments described hereinbefore illustrate 3D displays in which horizontal parallax is created by means of a horizontal one dimensional array of light sources and lenticular screens having cylindrical converging lenticules which extend vertically. For 3D displays in which vertical parallax is also required, a 2D array of light sources may be used, with the lenticular screens replaced by 2D arrays of converging lenses, such as spherical convex lenses. The lens arrays may be in the form of spherical microlens arrays with lenslets arranged in any convenient pattern. For instance the vertical and horizontal pitches of the lenslets may be similar or equal. Similarly, the SLM comprises a 2D array of cells, each of which corresponds to and is aligned with a lenslet of the array of smaller pitch.

Figure 8:
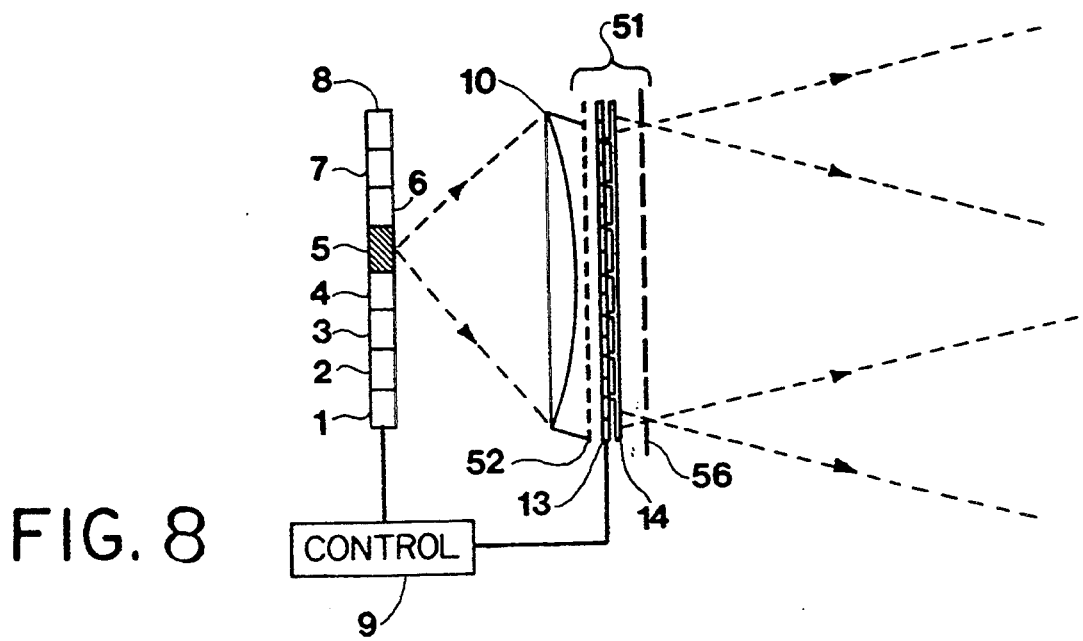
FIG. 8 is a plan view of a direct view display constituting a fifth embodiment of the invention.
Figure 9:
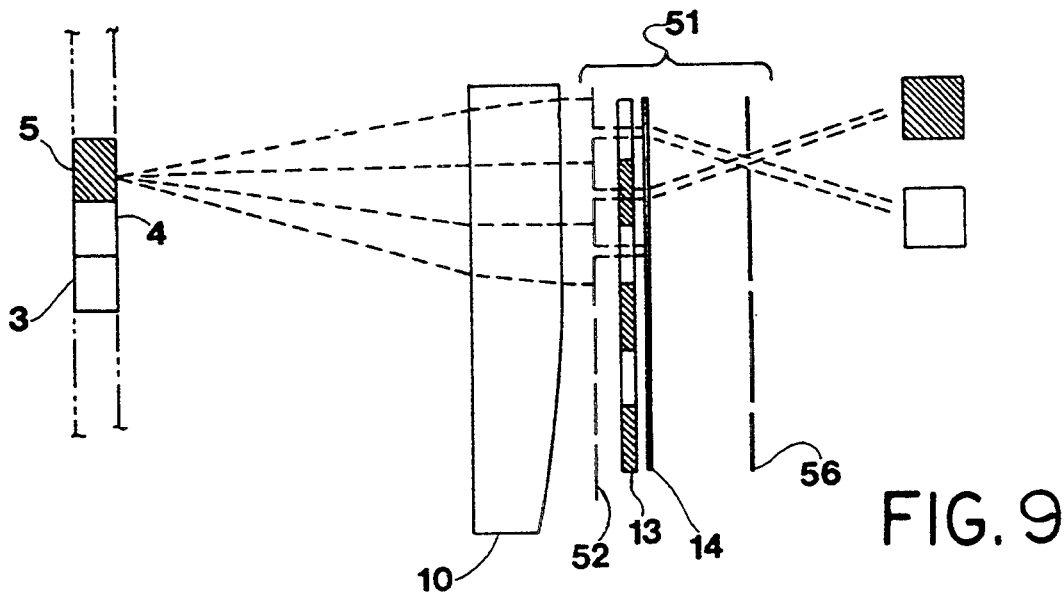
FIG. 9 is an enlarged plan view of part of the display of FIG. 8 illustrating the operation thereof.

Also, it is possible to replace the lenticular screens or lens arrays with parallax screens, for instance as shown in FIGS. 8 and 9. The display shown in FIGS. 8 and 9 is of the same type as that shown in FIGS. 1 to 3, with like reference numerals corresponding to like parts. However, the display of FIGS. 8 and 9 differs from that of FIGS. 1 to 3 in that the hybrid sandwich 11 is replaced by a hydrid sandwich 51 in which the lenticular screens 12 and 16 are replaced by parallax screens 52 and 56, respectively. Each of the parallax screens comprises a plurality of elongate parallel slits spaced apart horizontally with a pitch p. Each of the slits corresponds to and is aligned with the longitudinal axis of a respective one of the elongate picture elements of the SLM 13.

Similarly, the slits of the parallax screen 56 are spaced apart horizontally with a pitch P equal to Mp, where M is greater than one and, for most applications, is an integer. Each of the slits of the parallax screen 56 corresponds to a group of M picture elements or strip portions of the SLM 13 and is optically isolated from adjacent strip portions by the grid or barrier 15.

FIG. 9 corresponds to FIG. 2 and illustrates the light ray paths where the light source 5 is illuminated. The substantially collimated light from the lens 10 is restricted by the parallax screen 52 such that images of the slits are projected through respective strip portions of the SLM 13 on to the diffuser 14. The lateral positions of the images dependent on which of the light sources 1 to 8 is currently illuminated so that the images of the slits for different light sources are laterally displaced with respect to each other.

The slits of the parallax screen 56 limit the viewing angles of the images of the slits formed on the diffuser 14 such that each image is visible only from a predetermined angle corresponding to the angle of the view during image capture. Thus, the ray paths substantially correspond to those illustrated in FIG. 2.

Although the hybrid sandwich 51 using parallax screens permits 3D image display to be achieved, the light output, for a given power of illumination, of the display shown in FIGS. 8 and 9 is substantially less than the light output of the display shown in FIGS. 1 to 3.

In order to provide both vertical and horizontal parallax, the parallax screens 52 and 56 may be replaced by parallax screens having arrays of holes in place of the slits.

Although hybrid sandwiches either using two arrays of lenses, such as lenticular screens, or two parallax screens have been described and illustrated, it is also possible to provide mixed embodiments in which one of the elements is a lens array and the other is a parallax screen.

Figure 11:
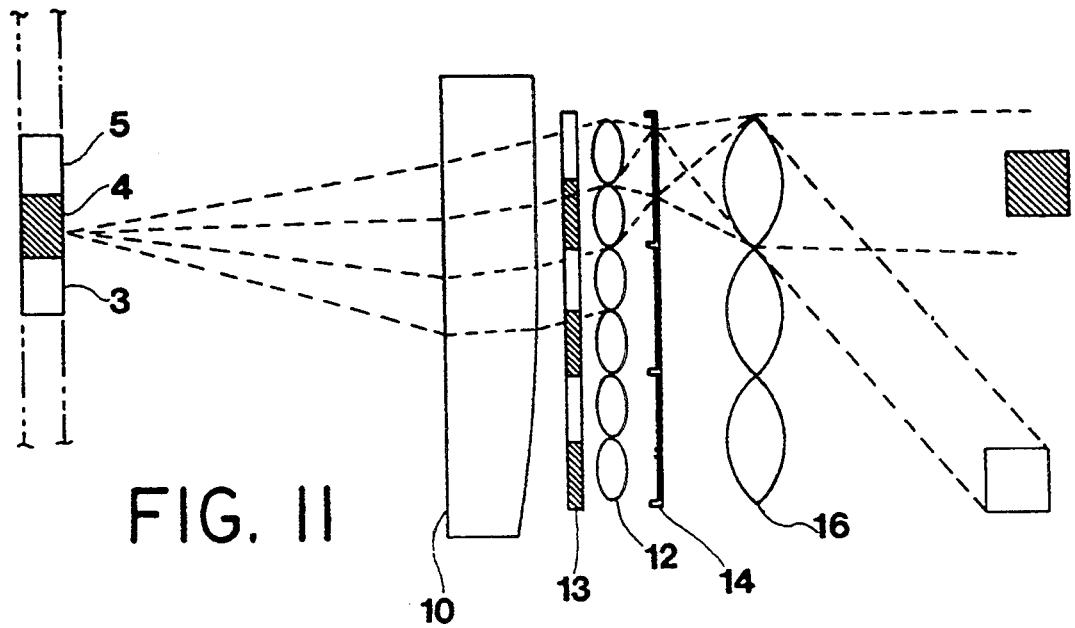
FIGS. 11 and 12 are enlarged views similar to FIGS. 3 and 9, respectively, showing modified embodiments of the invention.
Figure 12:
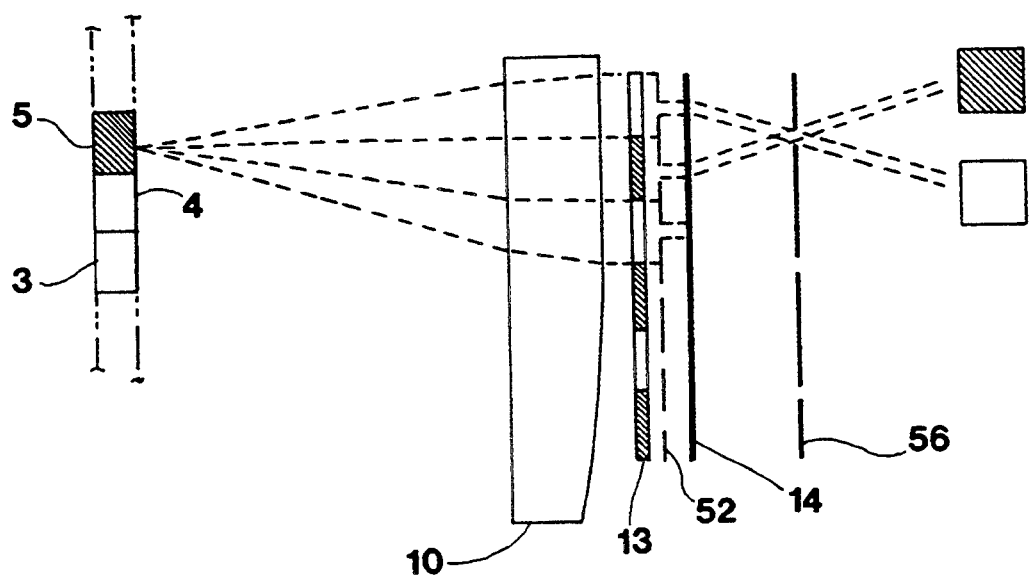

In the embodiments shown in FIGS. 1 to 4, 8, and 9, the SLM 13 is disposed between the lenticular screens 12 and 16 or the parallax screens 52 and 56. However, it is also possible to dispose the SLM 13 between the light sources 1 to 8 and the lenticular screen 12 as shown in FIG. 11 or between the light sources 1 to 8 and the parallax screen 52 as shown in FIG. 12. Otherwise, the modified embodiments shown in FIGS. 11 and 12 are identical to the embodiments shown in FIGS. 3 and 9, respectively.

Figure 10:
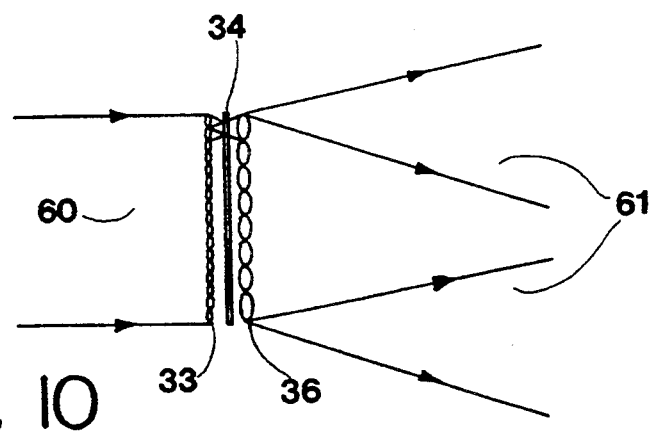
FIG. 10 shows a beam splitter constituting a sixth embodiment of the invention.

FIG. 10 illustrates another possible application of a lenticular screen arrangement 31 of the type shown in FIG. 5. Like reference numerals refer to like parts, so that the screen arrangement comprises a first lenticular screen 33, a diffuser 34, and a second lenticular screen 36. In this application, the screen arrangement is used as a beam splitter. An input beam 60 is incident on the lenticular screen 33 and is focused by the lenticules of the screen 33 into a plurality of images on the diffuser 34. Each of the lenticules of the screen 36 receives light from images formed by M lenticules of the screen 33, where M=2 in the embodiment shown. Thus, the lenticular screen 36 forms two output beams 61 which are emitted from the screen at different angles of emission.

The lenticular screen 36 effectively spatially samples the input beam 60 and the lenticular screen 36 reconstructs the two substantially identical output beams from the samples. Thus, if the input beam 60 carries lateral information, the usual precautions concerning the interaction of such information and the sampling frequency should be observed.

We claim:

1. An optical device comprising:
   a first two-dimensional array of lenses having a number N of groups of lenses, each of which comprises Z lenses where Z is an integer than one, the lenses of the first array being disposed with a pitch p in a first dimension; and
   a second two-dimensional array of of lenses facing the first array and having a number N of lenses disposed with a pitch P in the first dimension, where P>p and each lens of the second array is associated with a respective group of lenses of the first array, the first array of lenses and the second array of lenses being arranged so that light passes through the lenses of the first array and the lenses of the second array in this order.

2. A device as claimed in claim 1, characterised in that P=Zp.

3. A device as claimed in claim 1 characterised in that the lenses of the first array are disposed with a pitch q in a second dimension perpendicular to the first dimension, and the lenses of the second array are disposed with a pitch Q in the second dimension, where Q>q.

4. A device as claimed in claim 3, characterised in that Q=Yq, where Y is an integer greater than one.

5. A device as claimed in claim 1, further comprising a two dimensional spatial light modulator having a plurality of light modulating cells, each of which substantially corresponds to and is substantially optically aligned with a respective one of the lense of the first array.

6. A device as claimed in claim 1, characterised in that the lenses of the first array have a common image plane which coincides with a common object plane of the lenses of the second array.

7. A device as claimed in claim 6, characterised in that a diffuser is located at the common image and object planes of the lenses of the first and second arrays, respectively.

8. A device as claimed in claim 6, characterised in that a field lens array is located at the common image and object planes of the lenses of the first and second arrays, respectively.

9. A device as claimed in claim 1, characterised by illumination means for illuminating the first array with collimated light whose angle of incidence on the first array varies with time.

10. A device as claimed in claim 9, characterised in that the illumination means comprises at least one set of sequentially illuminatable light sources arranged as a one-dimensional array in the first dimension in the focal plane of a respective collimating optical system for the at least one set.

11. A device as claimed in claim 10, characterised in that each light source of the at least one set is contiguous with the each adjacent light source of the respective set.

12. A device as claimed in claim 10, further comprising a two dimensional spatial light modulator having a plurality of light modulating cells, each of which substantially corresponds to and is substantially optically aligned with a respective one of the lenses of the first array, and characterised by control means for sequentially illuminating the light sources of the at least one set, each lens of the second array being associated with M cells of the modulator the control means being arranged to conrtol the supply of image data to the modulator so that the modulator represents M images simultaneously, with the M cells associated with each lens of the second array representing elements of different ones of the M images.

13. A device as claimed in claim 12, characterised in that the control means is arranged to supply fresh image data to the modulator substantially synchronously with changing the illumination of the light sources of the at least one set.

14. A device as claimed in claim 9, characterised in that the illumination means comprises at least one set of sequentially illuminatable light source arranged as a two-dimensionsl array in the focal plane of a respective collimating optical system for the at least one set.

15. A device as claimed in claim 1, characterised by at least one projection means for projecting z spatially interlaced images onto the first array.

16. A device as claimed in claim 15, characterised in that the at least one projection means comprises a spatial light modulator, means for illuminating the spatial light modulator, and means for projecting an image of the illuminated spatial light-modulator onto the first array.

17. A device as claimed in claim 15, characterised in that the at least one projection means comprises a plurality of projection means arranged to project onto the first array at different angles or incidence.

18. An optical device characterised by comprising: a first parallax screen having a number N of groups of apertures, each of which comprises Z apertures where Z is an integer greater than one, the apertures of the first group being disposed with a pitch p in a first dimension; and a second parallax screen having a number N of apertures disposed with a pitch P in the first dimension, where P>p and each aperture of the second screen is associated with a respective group of apertures of the first screen.

19. An optical device characterised by comprising: a two-dimensional array of lenses having a number N of groups of lenses, each of which comprises Z lenses where Z is an integer greater than one, the lenses being disposed with a pitch p in a first dimension; and a parallax screen having a number N of apertures disposed with a pitch P in the first dimension, where P>p and each aperture of the screen is associated with a respective group of lenses of the array.

20. An optical device characterised by comprising: a parallax screen having a number N of groups of apertures, each of which comprises Z apertures where Z is an integer greater than one, the apertures of the first group being disposed with a pitch p in a first dimension; and a two-dimensional lens array having a number N of lenses disposed with a pitch P in the first dimension, where P>p and each lens of the array is associated with a respective group of apertures of the screen.

* * * * *

UNITED STATES PATENT AND TRADEMARK OFFICE
CERTIFICATE OF CORRECTION

PATENT NO. : 5,392,140
DATED : February 21, 1995
INVENTOR(S) : David Ezra and Graham J. Woodgate It is certified that error appears in the above-indentified patent and that said Letters Patent is hereby corrected as shown below:

Claim 1, column 7, line 18, after "integer" and before "than", insert --greater--.

Claim 1, column 7, line 21, change "of of lenses" to --of lenses--.

Signed and Sealed this

Eighth Day of August, 1995

Attest:

BRUCE LEHMAN

Attesting Officer

Commissioner of Patents and Trademarks